United States Patent
Kwon et al.

(10) Patent No.: US 12,492,419 B2
(45) Date of Patent: Dec. 9, 2025

(54) CELL IMMOBILIZED BEADS HAVING EXCELLENT CONVERSION ACTIVITY AND METHOD FOR PREPARING SAME

(71) Applicant: SAMYANG CORPORATION, Seoul (KR)

(72) Inventors: Soun Gyu Kwon, Gwangmyeong-si (KR); Bu-Soo Park, Hanam-si (KR); Sanghee Lee, Gwangju-si (KR); Jin-Ha Kim, Hongseong-gun (KR); Sin Hye Ahn, Goyang-si (KR); Eunsoo Choi, Seongnam-si (KR)

(73) Assignee: SAMYANG CORPORATION, Seoul (KR)

( * ) Notice: Subject to any disclaimer, the term of this patent is extended or adjusted under 35 U.S.C. 154(b) by 687 days.

(21) Appl. No.: 17/772,693

(22) PCT Filed: Oct. 30, 2020

(86) PCT No.: PCT/KR2020/015057
§ 371 (c)(1),
(2) Date: Apr. 28, 2022

(87) PCT Pub. No.: WO2021/086119
PCT Pub. Date: May 6, 2021

(65) Prior Publication Data
US 2022/0403430 A1    Dec. 22, 2022

(30) Foreign Application Priority Data

Oct. 31, 2019  (KR) .................. 10-2019-0138219
Oct. 30, 2020  (KR) .................. 10-2020-0143207

(51) Int. Cl.
*C12P 19/02* (2006.01)
*C12N 1/20* (2006.01)
*C12N 9/90* (2006.01)
*C12N 11/10* (2006.01)

(52) U.S. Cl.
CPC .............. *C12P 19/02* (2013.01); *C12N 1/20* (2013.01); *C12N 9/90* (2013.01); *C12N 11/10* (2013.01); *C12Y 501/03* (2013.01)

(58) Field of Classification Search
CPC . C12P 19/02; C12P 19/24; C12N 1/20; C12N 9/90; C12N 11/10; C12Y 501/03; C12R 2001/01
See application file for complete search history.

(56) References Cited

U.S. PATENT DOCUMENTS

| 8,735,106 B2* | 5/2014 | Hong ..................... C12N 9/90 435/320.1 |
| 2018/0112244 A1* | 4/2018 | Venkitasubramanian ................... C12N 9/90 |

FOREIGN PATENT DOCUMENTS

| JP | S58-28285 | 2/1983 | |
| JP | 11-000681 | 1/1999 | |
| JP | 2018-533958 | 11/2018 | |
| JP | 2019-500037 | 1/2019 | |
| KR | 10-0864399 | 10/2008 | |
| KR | 10-2011-0035805 | 4/2011 | |
| KR | 10-1255647 | 4/2013 | |
| KR | 101255647 B1 * | 4/2013 | ............... C08J 3/12 |
| KR | 10-1616050 | 4/2016 | |
| KR | 101616050 B1 * | 4/2016 | ............. C12P 19/02 |
| KR | 10-2017-0057078 | 5/2017 | |
| KR | 10-2017-0067070 | 6/2017 | |
| WO | 2014-175655 | 10/2014 | |
| WO | 2018-221815 | 12/2018 | |

OTHER PUBLICATIONS

Corretto E, Antonielli L, Sessitsch A, Höfer C, Puschenreiter M, Widhalm S, Swarnalakshmi K, Brader G. Comparative Genomics of Microbacterium Species to Reveal Diversity, Potential for Secondary Metabolites and Heavy Metal Resistance. Front Microbiol. Aug. 4, 2020;11:1869. (Year: 2020).*
Zhang M, Case DA, Peng JW. Propagated perturbations from a peripheral mutation show interactions supporting ww domain thermostability. Structure. Nov. 6, 2018;26(11):1474-1485.e5. (Year: 2018).*
Vorlop, K.D., Steinert, H.J. and Klein, J. (1987), Cell Immobilization within Coated Alginate Beads or Hollow Fibers Formed by Ionotropic Gelation. Annals of the New York Academy of Sciences, 501: 339-342. (Year: 1987).*
KIPO, PCT Search Report & Written Opinion of PCT/KR2020/015057 dated Jan. 29, 2021.
Park, Jong-Uk et al., "Construction of Heat-Inducible Expression Vector of Corynebacterium glutamicum and C. ammoniagenes: Fusion of λ Operator with Promoters Isolated from C. ammoniagenes", J. Microbiol. Biotechnol., 18:639-647, 2008.
KIPO, Notice of Allowance of the corresponding Korean Patent Application No. 10-2020-0143207 dated Oct. 14, 2022.
JPO, Office Action of the corresponding Japanese Patent Application No. 2022-525216, dated May 23, 2023.

* cited by examiner

*Primary Examiner* — Manjunath N Rao
(74) *Attorney, Agent, or Firm* — LEX IP MEISTER, PLLC

(57) ABSTRACT

The present disclosure relates to cell immobilized beads and a method for preparing the same and, more specifically, to cell-immobilized beads wherein the conversion activity of cells contained in the immobilized beads is excellent and wherein the conversion activity is maintained even during distribution and storage processes, a method for preparing the cell-immobilized beads, and a use of the conversion activity of the beads.

16 Claims, 6 Drawing Sheets

| Production step | Microbacterium oxydans | Microbacterium phyllosphaerae |
|---|---|---|
| Bead forming step |  |  |
| Bead drying step |  |  |
| Bead filling step (fructose soaking) |  |  | ium # CELL IMMOBILIZED BEADS HAVING EXCELLENT CONVERSION ACTIVITY AND METHOD FOR PREPARING SAME

TECHNICAL FIELD

The present disclosure relates to cell immobilized beads and a method for preparing the same and, more specifically, to cell immobilized beads wherein the conversion activity of cells contained in the immobilized beads is excellent and wherein the conversion activity is maintained even during distribution and storage processes, a method for preparing cell immobilized beads, and a use of the conversion activity of the beads.

BACKGROUND ART

Allulose is attracting growing attention as a diet sweetener, but it belongs to a rare saccharide which is a monosaccharide existing very rarely in nature. Thus, in order to apply it to the food industry, it is necessary to develop a technology for efficiently producing allulose. As the conventional method for producing allulose, a production method through a chemical synthesis process, and a biological production method using microbial enzymes have mainly been known. For recent food materials, environmentally friendly biological production methods are more preferred than chemical production methods, whereby many studies have been conducted on the use of microorganisms in the production method of allulose.

Allulose epimerase, which is a fructose-converting allulose-producing enzyme possessed by microorganisms that produce allulose, is eluted extracellularly, and a production method by an enzyme immobilization method and a production method by the immobilization of a cell-containing carrier are being studied industrially. However, among them, a production method using a cell immobilized carrier by a more economical method without a process of obtaining an enzyme from a cell is mainly applied industrially. As the cell immobilized carrier used for the production of allulose, alginic acid suitable for producing food materials is used. Alginic acid is used as a food additive in various fields such as lactic acid bacteria capsules, beverages, medical tissue engineering materials and drug delivery systems. Since alginic acid easily forms a hydrogel, it is often used as a carrier (bead), and particularly, it is often used for the immobilization of enzymes and cells. Further, alginate beads using alginic acid or a salt thereof are swellable and stretchable porous materials which randomly form beta-1,4 bonds, so that cells or enzymes can be stably immobilized, which is thus advantageous.

However, the cell immobilized beads by alginic acid become rotten over several hours in a state where they are exposed to an environment where microorganisms can grow in a state containing a large amount of moisture, whereby due to the weakening of the binding force of the beads, the activity of the allulose epimerase in the cells is also rapidly reduced along with the release of the cells from the carrier, which reduces the rate of allulose production during the fructose-converted allulose production reaction.

Additionally, in the state of being immersed in an aqueous bead solution using alginic acid or a salt thereof, the characteristic of porosity is well preserved, but there is a problem that it is difficult to store and distribute outside the aqueous solution without special chemicals and prevention against contamination. That is, because the cell-immobilized alginic acid carrier containing water exists in the fresh water state similarly to the time when it was prepared, storage is not easy during mass production, and strict restrictions such as high cost and storage in liquid state may occur during distribution.

Further, since the pH suitable for the activity of most enzymes and cells is mainly distributed near pH 7, they have the feature of swelling and decomposition caused by the weakening of the binding force of alginic acid beads near pH 7, and the feature of weakening the binding force at high temperature, and so their application is limited industrially.

In order to solve these problems, there is a need for a method for preparing dried beads excellent in storage and distribution in which conversion activity is maintained, by establishing the production process and conditions for removing the water contained in the alginic acid carrier on which the biocatalysts such as cells and enzymes are immobilized.

DETAILED DESCRIPTION OF THE INVENTION

Technical Problem

An object of the present disclosure is to provide dried beads for producing allulose in which the microbial cells of *Microbacterium* sp. strain having an allulose conversion activity to produce allulose from fructose are immobilized on alginic acid or a salt thereof, and a method for preparing the same.

Another object of the present disclosure is to provide restored beads which are obtained by restoring the dried beads for producing allulose from fructose with water or fructose solution, and a composition for producing allulose using the same, or a method for producing an allulose-containing product from a fructose-containing substrate using the same.

Yet another object of the present disclosure is to provide a composition for producing allulose comprising the dried form of the cell immobilized beads, or a method for preparing an allulose-containing product from a fructose-containing substrate using the same.

Technical Solution

An embodiment of the present disclosure provides dried beads in which the microbial cells of *Microbacterium* sp. strain having an allulose conversion activity to produce allulose from fructose are immobilized on a carrier and dried, thereby being low in water content and a method for preparing the same, restored beads obtained by restoring the dried beads and a method for preparing the same, and a composition for producing allulose comprising the dried beads and/or restored beads and a method for producing allulose.

The dried beads comprising the microbial cells immobilized on the carrier according to the present disclosure has a low water content, and excellent storage stability and thermal stability.

Further, the restored beads obtained by restoring the dried beads have excellent restoration rates of physical properties, and thus exhibit a level similar to the physical properties of the beads before drying, and have a relatively equivalent or similar level of allulose conversion reaction activity. The dried beads reduce the volume of the beads increase allulose production amount by increasing the column filling amount per unit volume. They provide high storage stability and stably provide a high allulose production amount for a long period of time, by solving the problems that undried beads in water-containing state have released the cells outside the beads and decreased converstion acvitiy caused by weak binding force and decomposition due to contamination of microorganisms during storage in the conventional case.

An embodiment of the present disclosure relates to dried beads for producing allulose, which comprises alginic acid or alginate as a carrier and a microbial cell of *Microbacterium* sp. microorganism producing allulose epimerase which is immobilized on the carrier, and has a water content of 14% or less.

Another embodiment of the present disclosure relates to restored beads obtained by restoring the dried beads using water or fructose solution.

The moisture content or water content of the dried beads according to the present disclosure is 14% or less, and the dried beads obtained after drying may have a volume or weight of 50% or less, based on 100% of the volume or weight of the undried beads having a water content of 90% or more.

An embodiment of the present disclosure relates to dried beads in which the microbial cells of *Microbacterium* sp. strain having an allulose conversion activity to produce allulose from fructose are immobilized on a carrier and dried, thereby being low in water content.

Specifically, the dried beads according to the present disclosure may have at least one or more of the following properties:
 (i) the moisture content is 14% or less,
 (ii) the weight after drying is 35% or less based on 100% of the weight of the undried beads,
 (iii) an bulky density is 0.6 to 0.8 Kg/L,
 (iv) an allulose conversion activity is 60% or more after being stored at a temperature of 25° C. for 38 weeks after production, based on 100% conversion activity of dried beads immediately after production,
 (v) an allulose conversion activity is 50% or more after being stored at a temperature of 60° C. for 38 weeks after production, based on 100% conversion activity of dried beads immediately after production,
 (vi) a reaction column filling rate (% by volume) is 35% or less, based on 100% of the reaction column filling rate (% by volume) of undried beads having a water content of 90% or more, and
 (vii) the average particle diameter of the restored beads restored from the dried beads is 1.1 to 1.9 mm.

A further embodiment of the present disclosure relates to restored beads in which the dried beads are restored using water or fructose solution. Specifically, the restored beads may have at least one or more of the following properties:
 (i) 90% or more of a water content,
 (ii) 35% or more of a reaction column filling rate (% by volume) of, based on 100% of the reaction column filling rate (% by volume) of undried beads having a water content of 90% or more,
 (iii) 1.1 to 1.9 mm of an average particle diameter of the beads,
 (iv) 120 to 190% of an average particle diameter of the restored beads, based on 100% of the average particle diameter of the dried beads,
 (v) 110 to 300 of a substrate feed flow rate (mL/min) that the allulose conversion rate is maintained at 25% or more by feeding 50 wt % of a fructose solution, based on 100% substrate feed flow rate of undried beads, and
 (vi) about 110% or more of an allulose production amount of allulose conversion product obtained from a fructose-containing raw material, based on 100% of the allulose production amount of the beads before drying.

Specifically, the moisture content or water content of the dried beads according to an embodiment of the present disclosure may be 14% or less, 12% or less, 10% or less, 9.9% or less, 9.5% or less, 9.0% or less, 8.9% or less, 8.7% or less, 8.5% or less, or 8% or less, the lower limit value of the water content may be 1% or more, 2% or more, 3% or more, 4% or more, or 5% or more, and the range of the water content may be a combined range of the upper limit value and the lower limit value, for example 1 to 14%, 2 to 12%, 3 to 10%, 3 to 8%, 4 to 8% or 5 to 8%.

For the dried beads, based on 100 wt % of the undried beads, for example, the undried beads having a water content of 90% or more, the weight of the beads after drying may be 35 wt % or less, 30 wt % or less, 25 wt % or less, 20 wt % or less, 17 wt % or less, 15 wt % or less, 12 wt % or less, 10 wt % or less or 8 wt % or less, preferably 30 wt % or less, 25 wt % or less, 20 wt % or less, 17 wt % or less, 15 wt % or less, 12 wt % or less, 10 wt % or less or 8 wt % or less. Specifically, in 100 g of the beads before drying obtained by recovering the prepared beads from the solution, the weight after drying may be 50 g or less, for example, 10 g or less. The change in weight (mass) of the dried beads is expressed as a relative percentage value by measuring the weight before drying and the weight after drying, and the weights before and after drying have the same measurement unit.

The dried beads according to the present disclosure is excellent in the recovery rate of the physical properties of the beads upon restoration, and the allulose conversion reaction efficiency shows a level similar to that of beads before drying.

Further, based on 100% of the reaction column filling rate (vol %) of undried beads, for example, undried beads having a water content of 90% or more, the dried beads may have the reaction column filling rate (vol %) of 35% or less, 30% or less, 25% or less, 20% or less, 17% or less, 15% or less, 13% or less or 11% or less, for example, 1.0 to 35%, 1.0 to 30%, 1.0 to 25%, 1.0 to 20%, 1.0 to 20%, 1.0 to 17%, 1.0 to 15%, 1.0 to 13%, 1.0 to 11%, 3.0 to 35%, 3.0 to 30%, 3.0 to 25%, 3.0 to 20%, 3.0 to 20%, 3.0 to 17%, 3.0 to 15%, 3.0 to 13%, 3.0 to 11%, 5.0 to 35%, 5.0 to 30%, 5.0 to 25%, 5.0 to 20%, 5.0 to 20%, 5.0 to 17%, 5.0 to 15%, 5.0 to 13%, 5.0 to 11%, 5.5 to 35%, 5.5 to 30%, 5.5 to 25%, 5.5 to 20%, 5.5 to 20%, 5.5 to 17%, 5.5 to 15%, 5.5 to 13%, or 5.5 to 11%.

Specifically, in 100 mL of the beads before drying in the prepared beads have recovered from the solution, the volume after drying may be 35 mL or less, for example, 15 mL or less. The change in volume of the dried beads is expressed as a relative percentage value by measuring the volume before drying and the volume after drying, and the volume before and after drying has the same measurement unit.

For the dried beads, the same weight of the beads are reduced in water content, so that the volume decreases and the density increases. The dried beads according to the present disclosure are reduced in volume and weight as compared with the beads before drying, which can make it easy storage and distribution. The excellent restoration rates of physical properties, and thus exhibit a level similar to the physical properties of the beads before drying, and have a relatively equivalent or similar level of allulose conversion reaction activity. The dried beads reduce the volume of the beads increase allulose production amount by increasing the column filling amount per unit volume. They provide high storage stability and stably provide a high allulose production amount for a long period of time, by solving the problems that undried beads in water-containing state have released the cells outside the beads and decreased converstion activity caused by weak binding force and decomposition due to contamination of microorganisms during storage in the conventional case.

The dried beads according to the present disclosure have excellent storage stability and thermal stability, and thus have the advantage of maximally maintaining allulose conversion activity of beads before drying. When preparing dried beads, it is important to have physical properties and activities close to those of the beads before drying.

Specifically, based on 100% of the conversion activity of the dried beads immediately after production, the dried beads may have the allulose conversion activity of dried beads after dried beads are prepared and then stored at a temperature of 25° C. for 38 weeks, of 60% or more, 70% or more, 75% or more, 80% or more, 85% or more, 90% or more, or 91% or more, 92% or more, 93% or more, or 94% or more. Based on 100% of the conversion activity of the dried beads immediately after production, the dried beads may have the converstion activity of enzyme of the dried beads after dried beads are prepared and then stored at a temperature of 60° C. for 38 weeks, of 50% or more, 60% or more, 70% or more, or 75% or more.

An example of the storage stability measurement proceeds under the condition where the dried beads are stored in a fructose-containing substrate solution. The stored beads are filled in a reaction column, and a substrate containing 50 brix (%) of fructose, which is adjusted to a temperature of 50° C. and a pH of 6.5 to 7.2, is flowed through the reaction column filled with the beads, and an allulose conversion reaction is performed under a flow rate maintained at an allulose conversion rate of 25% or more, and allulose contained in the obtained conversion reaction product is quantified. The measurement of the allulose conversion activity is carried out in the same manner as the beads before storage, and can be expressed as a percentage of the relative conversion activity based on 100% of the allulose conversion activity of the beads before storage. The fructose-containing substrate may be a fructose-containing raw material having a solid content of 40 to 60% by weight and a fructose purity of 30 to 99% (w/w).

Further, the dried beads according to the present disclosure can provide higher conversion and production amount for a longer period of time in the production of allulose from fructose-containing substrates. Specifically, for the dried beads, based on 100% of allulose production amount of beads before drying, the allulose content of the allulose conversion reaction products obtained from a fructose-containing raw material having a solid content of 40 to 60 wt % and a fructose purity of 30 to 99% (w/w) by using the restored beads restored with a fructose solution, may be about 110% or more, 120% or more, 130% or more, 140% or more, 150% or more, 160% or more, 170% or more, or 180% or more, preferably 150% or more, 160% or more, 170% or more, or 180% or more, for example 101 to 300%, 105 to 300%, 110 to 300%, 120 to 300%, 130 to 300%, or 140 to 300%. Preferably, the microbial cells used in the beads may be cells treated by heat at a temperature of 30 to 70° C., and the allulose content of the allulose conversion reaction product using the restored beads restored with fructose solution may be about 150% or more, 160% or more, 170% or more, 180% or more, 190% or more, or 200% or more, the upper limit value may be 205% or less, 210% or less, 220% or less, 230% or less, 250% or less, 260% or less, 270% or less, 280% or less, 290% or less, 300% or less, and the ranges may be a combined value of the lower limit value and the upper limit value, based on 100% of allulose production amount using beads before drying.

For the restored beads, substrate feed flow rate (mL/min) of the restored beads at which the allulose conversion rate is maintained at 25% or more by feeding a fructose solution, may be 0.15 or more, 0.17 or more, 0.20 or more, 0.22 or more, or 0.24 or more, for example, 0.15 to 0.5, 0.17 to 0.5, 0.20 to 0.5, 0.22 to 0.5, or 0.24 to 0.5.

When the dried beads are restored with water or fructose solution according to an embodiment of the present disclosure, they can be restored to an original spherical shape in water or fructose solution, for example, at the time of filling the dried beads in the reaction column used for allulose production.

Specifically, the restored beads obtained by restoring the dried beads according to the present disclosure may have a reaction column filling rate (vol %) of 35% or more, 40% or more, or 45% or more, based on 100% of the reaction column filling rate (% by volume) of undried beads.

According to an embodiment of the present disclosure, the dried beads requires a process of allowing them to be restored to their original shape before being used in a reaction for converting allulose from fructose. The restoration method can be performed to their original shapes by adding dried beads to water, or the reaction substrate containing fructose. Specifically, after 10 g of dried beads are placed in a beaker, 200 mL of water is added at room temperature, and then stirred at a speed of 100 rpm for 30 minutes or more to restore to a shape close to the original spherical shape.

According to an embodiment of the present disclosure, dried beads before restoration are put into a reaction column, and then, the dried beads are hydrated by a method in which the substrate for conversion reaction used in the production of allulose is fed or circulated at a supply flow rate of 0.2 to 0.5 SV at a reaction temperature of 50° C. to restore to its original shape.

The average particle diameter of the restored beads obtained by restoring the dried beads may be 1.1 to 1.9 mm, 1.15 to 1.9 mm, 1.2 to 1.9 mm, 1.25 to 1.9 mm, 1.3 to 1.9 mm, 1.1 to 1.8 mm, 1.15 to 1.8 mm, 12 to 1.8 mm, 1.25 to 1.8 mm, 13 to 1.8 mm, 1.1 to 1.7 mm, 1.15 to 1.7 mm, 12 to 1.7 mm, 1.25 to 1.7 mm, 13 to 1.7 mm, 1.1 to 1.6 mm, 1.15 to 1.6 mm, 12 to 1.6 mm, 1.25 to 1.6 mm, or 1.3 to 1.6.

The average particle diameter (mm) of the restored beads restored from the dried beads may be 120% or more, or 130% or more, for example, 120% or more to 190%, 130% or more to 190%, 120% or more to 180%, 130% or more to 180%, 120% or more to 170%, 130% or more to 170%, 120% or more to 160%, or 130% or more to 160%, based on 100% of the average particle diameter (mm) of the dried beads.

Specifically, the volume can be restored to 40% or more, for example, 40 to 70% based on 100% of the initial reaction column filling volume, and thus the reaction column filling rate is increased as compared with the undried beads, thereby providing higher productivity per unit volume as compared with the undried beads.

According to an embodiment of the present disclosure, there is provided a method for preparing dried beads in which cells of *Microbacterium* sp. strain having an allulose conversion activity to produce allulose are immobilized on a carrier and dried, thereby being low in water content.

The characteristics of the dried beads are the same as those described above in the description of the dried beads.

More specifically, the method for preparing dried beads includes a bead forming step of immobilizing the cells on a carrier and a drying step, and optionally can perform one or more additional steps selected from the group consisting of a heat treatment step of cells to be used for bead formation, a low-temperature curing of beads and a bead coating step.

In the preparation method according to the present disclosure, the bead forming step can performed by dropwise adding a mixed solution containing allulose-producing cells or enzymes and alginic acid or a salt thereof as a carrier, to a reaction solution containing the chloride compound of divalent cation.

After the bead forming step, the method may include one or more treatment steps selected from the group consisting of a step of curing the beads containing cells or enzymes, a step of washing the chloride compound of divalent cation and, and a step of treating the cells or enzyme-containing beads with a fructose-containing substrate. The additional steps performed after bead formation can be performed by methods known to those skilled in the art, and are not particularly limited.

In examples of the bead forming step, microbial cells of the strain, a culture comprising the enzyme produced by the strain, or a lysate of the strain are added to a sodium alginate aqueous solution in 1 to 2 volume times of the microbial cells of strain, the culture containing the enzyme produced by the strain or the lysate of the strain and mixed, and then the obtained mixed solution is dropped to about 0.2M calcium ion solution by using a syringe pump and a vacuum pump, thereby being able to produce a bead. The enzyme can be purified from the strain, strain culture or lysate of strain by methods such as common methods, for example, methods of dialysis, precipitation, adsorption, electrophoresis, affinity chromatography, ion exchange chromatography, etc.

In the present disclosure, alginic acid or a salt thereof is used as the carrier, wherein the alginate is not particularly limited, and examples thereof include sodium alginate, potassium alginate, magnesium alginate, ammonium alginate, and the like. For example, alginic acid, sodium alginate, or potassium alginate salt as the carrier may have a viscosity of 2,000 to 50,000 cps. Further, the concentration of the alginate solution in the bead forming step is 1 wt % to 10 wt %, preferably 1 wt % to 8 wt %, more preferably 2 wt % to 5 wt % in consideration of agglomeration formation and convenience of the preparation process, but is not limited thereto.

The microbial cell producing allulose may be a wild-type strain that produces an allulose epimerase or a recombinant strain introduced by a gene encoding an allulose. Alternatively, it may be cells of the strain, or an enzyme obtained from the strain, obtained from a strain producing an allulose epimerase or a recombinant strain introduced by a gene encoding an allulose epimerase may be obtained.

The microbial cells to be immobilized on the beads may be cells that have been heat-treated at a temperature of 30 to 70° C., or 30 to 65° C., 40 to 65° C., 50 to 63° C., for example, 60° C., wherein the heat treatment can be performed for 0.1 hours to 2 hours. The allulose-producing cells may be cells recovered from the culture medium or cells obtained by heat-treating the culture solution. The heat-treated cells themselves (allulose conversion activity measured with cells and not beads) have a relative allulose conversion activity of 101% or more, 105% or more, 110% or more, for example, 101 to 160%, as compared to the cells before heat treatment. Further, the viscosity of the mixed solution of the cells and alginic acid or a salt thereof in the bead forming step may be 90% or less, for example, 4,000 to 6,000 cps compared to the mixed solution containing the cells without heat treatment, when measured at 25° C. for a mixture of 2% (w/w) cell concentration and 2% (w/w) alginic acid comprising cells before heat treatment.

In examples of the heat treatment method, the immobilized beads mixed with alginic acid and cells are dried at 20 to 70° C. to remove the water content of the beads to 14% or less, and thereby, dried beads can be prepared in an amount of about 50% or less based on 100% of the volume or weight of the initial beads before drying.

In a specific embodiment of the present disclosure, the strain that produces allulose epimerase may be a strain that can produce allulose epimerase in high yield while having high stability. Preferably, it may be a *Microbacterium* sp. strain, for example, *Microbacterium foliorum*, *Microbacterium oxydans*, or *Microbacterim phyllosphaerae*, but is not limited thereto.

In the preparation method of the dried beads for allulose production, it may preferably be one that does not perform a freezing process, which causes a problem that the activity of the cells is lowered during the freezing process, and that the production cost rises rapidly when the freeze-drying process is performed in large quantities. Specifically, the dried beads performs drying using air or wind, and the drying can be performed by a method that circulates the air for several hours using air having a temperature of 20 to 70° C., for example 40 to 50° C.

Specifically, in the bead forming step, a step of treating the beads with a divalent metal ion is performed alone, or a step of coating the beads with a swelling inhibitor after performing a step of treating the beads with a divalent metal ion can be performed.

In the step of treating with a divalent metal, beads can be treated with one or more divalent metal ions selected from the group consisting of $Mn^{2+}$, $Zn^{2+}$, $Co^{2+}$, $Mg^{2+}$, $Ni^{2+}$, $Fe^{2+}$, and $Cu^{2+}$. Specifically, this step can be performed by supporting the beads containing the enzyme or cells on an aqueous solution containing the divalent metal ion or a fructose-containing substrate solution, or pouring an aqueous solution containing the divalent metal ion or a fructose-containing substrate solution onto a column filled with the beads. The content of the divalent metal ion contained in the aqueous solution containing the divalent metal ion or the fructose-containing substrate solution may be 1 mM to 15 mM, but in order to have a sufficient compression effect of the beads, it is preferably treated with 5 mM to 10 mM.

The step of coating the beads with a swelling inhibitor may be performed by immersing or adding the beads to a solution containing the swelling inhibitor. The swelling inhibitor may be at least one selected from the group consisting of chitosan, chitin, polyethylene glycol (PEG), polyethyleneimine (PEI), chito-oligosaccharide and polylysine. When chitosan-oligosaccharide is used as the swelling inhibitor, the weight average molecular weight may be in the range of 700 to 9,000, but is not particularly limited. The concentration of the swelling inhibitor solution in the coating step may be 0.1 wt % to 10 wt %, preferably 0.1 wt % to 5 wt %, but is not limited thereto.

A further embodiment of the present disclosure provides a composition for producing allulose which comprises dried beads containing the microbial cells and carrier, or a method for producing allulose using a fructose-containing substrate using the dried beads.

Preferably, the method for producing allulose according to the present disclosure can be performed by filling a column with beads containing an enzyme or a bacterial cell and flowing a fructose-containing substrate solution, and a person skilled in the art can easily select and perform appropriate ones according to the enzyme, cell, or the immobilized carrier used.

In a specific embodiment of the present disclosure, when a fructose solution is supplied at a certain concentration to a filled column filled with cells containing allulose epimerase, the epimerization reaction proceeds by the immobilized cells, and fructose is converted to allulose. The converted allulose can be used as a pure allulose after separation and purification using a separation column The immobilization reactor used herein refers to a reactor in which a reaction for producing allulose occurs by means of cells or enzymes immobilized on a carrier, or through a column filled with cells or enzymes immobilized on a carrier. That is, the immobilization means that a material providing biological activity, in this case, an allulose epimerase or a glucose epimerase, or a cell containing them, is immobilized on a carrier.

The operation stability used herein means that the bioreactor can be operated while maintaining an appropriate level of productivity relative to the initial activity in order to continuously produce a target product such as allulose, and it is usually expressed as the operation period. When allulose is produced using the compression ratios according to the present disclosure, for example, the allulose content of the reactant obtained from the fructose-containing substrate at a concentration of 40 to 50 brix can be provided in an amount of 20% by weight or more for a period of 15 days or more. Further, the column filled with the dried beads is supplied at a flow rate having a maximum conversion rate of 90 to 100 of the reaction product obtained from the substrate supplied at a temperature condition of 50° C., and the operation stability can be ensured under the condition of supplying at a constant flow rate until the point where the allulose content decreases to 20% by weight or less.

In the method for producing allulose, the concentration of fructose used as a substrate for efficient allulose production may be 40 to 75% (w/v), e.g., 50 to 75% (w/v), based on the total reactants. When the concentration of fructose is lower than the above range, the economic efficiency is lowered, and when the concentration is higher than the above range, fructose does not dissolve well. Therefore, the concentration of fructose is preferably within the above range. The fructose may be used in the form of a buffer solution or a solution dissolved in water (e.g., distilled water).

In the method for producing allulose, the reaction may be performed under conditions of pH 6 to 9.5, for example, pH 7 to 9, pH 7 to 8, or pH 8 to 9. Further, the reaction may be carried out under a temperature condition of 30° C. or more, for example 40° C. or more.

When the temperature rises above 80° C., browning phenomenon of fructose, which is a substrate, may occur. Therefore, the reaction may be performed under conditions of 40 to 80° C., for example, 50 to 75° C., 60 to 75° C., or 68 to 75° C.

Further, the longer the reaction time, the higher the allulose conversion rate. For example, the reaction time can be appropriately adjusted in consideration of industrial and economic aspects, and it can be selected as the condition where the conversion efficiency of fructose to allulose is maximized Cycose obtained from fructose by the method of the present disclosure can be purified by a conventional method, and such determination is within the ordinary skill of the person skilled in the art. For example, it can be performed by one or more methods selected from the group consisting of centrifugation, filtration, crystallization, ion exchange chromatography, and combinations thereof.

Advantageous Effects

The dried beads, restored beads, and allulose production using these according to an embodiment of the present disclosure is reduced in the volume and weight as compared with the beads before drying, so that storage and distribution are easy. They are increased in the column filling amount per unit volume, and thus are increased in allulose production amount and is high in storage stability. Thereby, they has the advantage of solving the problems that the binding force of beads is weakened and decomposed due to microbial contamination in the conventional storage process, resulting in the outflow of cells to the outside of the beads and the decrease in conversion activity, and further being able to stably provide a high allulose production amount for a long period of time.

DETAILED DESCRIPTION OF THE EMBODIMENTS

Figure 1:
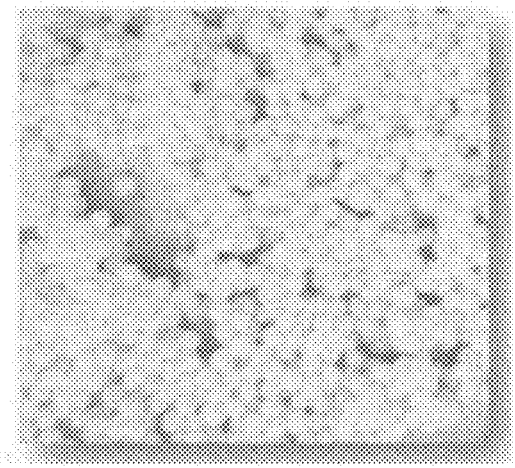
FIG. 1 shows photographs of beads before drying and beads obtained after drying, with the immobilized beads being dried according to an embodiment of the present disclosure.
Figure 1:
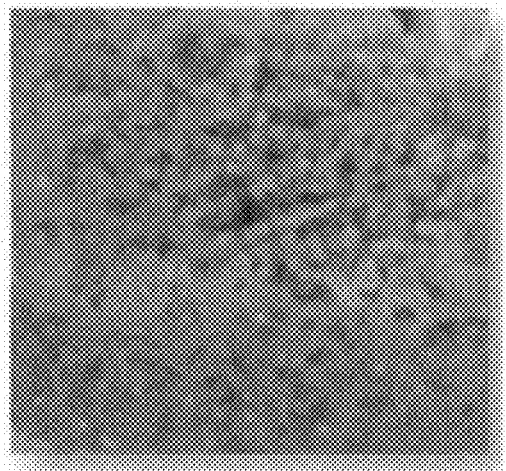
Figure 2:
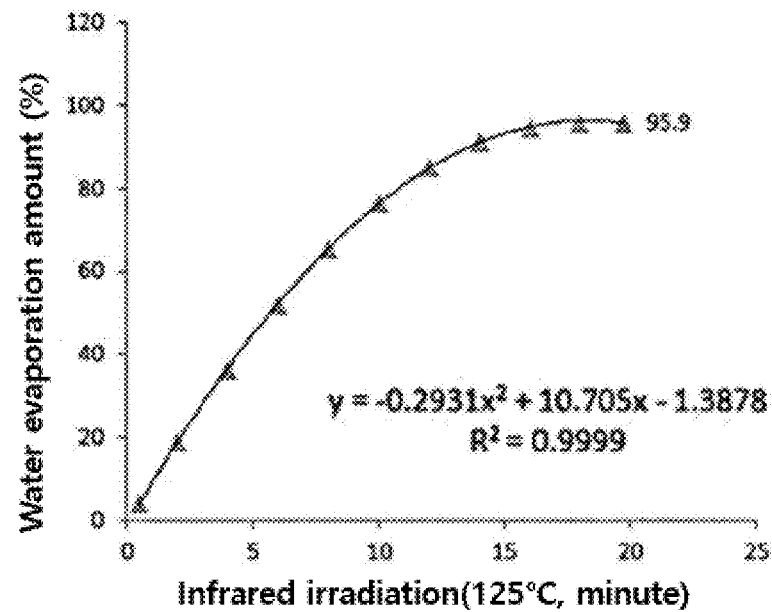
FIG. 2 is a graph showing the water evaporation amount of the beads obtained before drying in Example 1-3 and the dried beads obtained in Example 2.
Figure 2:
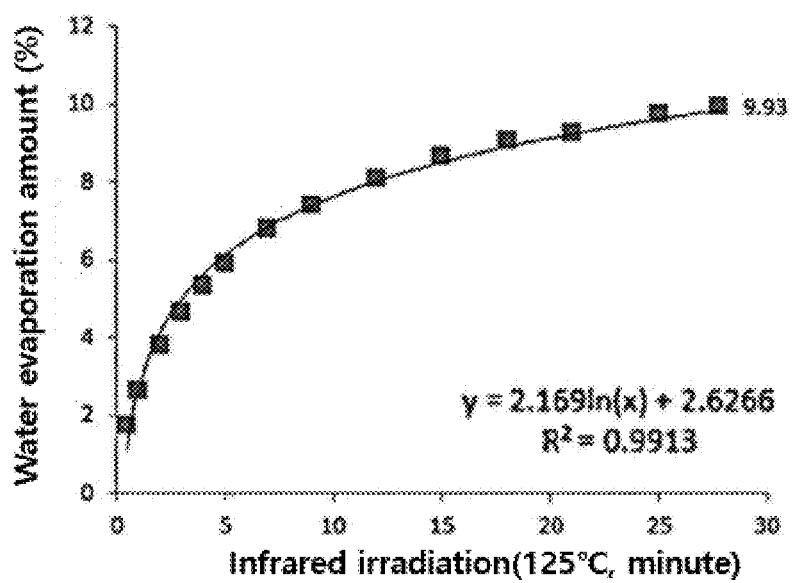

The present disclosure will be described in more detail with reference to the following examples, but these examples are not intended to limit the scope of the present disclosure.

Example 1: Preparation of Cell Immobilized Beads 1-1: Preparation of Microbial Cells For high-concentration culture of *M. foliorum* described in Korean Patent No. 10-1944103, each seed medium was prepared according to the compositions of Table 1 below, and then subjected to high-temperature and high-pressure steam sterilization at 121° C. for 15 minutes or more to prepare each seed medium. The composition of each seed medium and the main culture medium (initial culture medium) was selected as shown in Table 2 below in consideration of price competitiveness and productivity, and DPEase was induced with allulose to increase DPEase activity.

TABLE 1

| Medium component | Primary seed culture | Secondary seed culture | Main culture |
|---|---|---|---|
| Alullose (g/L) | 5 | 5 | 10 |
| $MgSO_4$—$7H_2O$(g/L) | 0.5 | 0.5 | 1.5 |
| Yeast extract(g/L) | 2 | 2 | 4 |
| $(NH4)_2SO_4$(g/L) | 7 | 7 | 7 |
| $KH_2PO_4$(g/L) | 0.5 | 0.5 | 0.5 |
| $K_2HPO_4$ (g/L) | 0.5 | 0.5 | 0.5 |
| $FeSO_4$—$7H_2O$ (mg/L) | 6 | 6 | 12 |
| $MnSO_4$—$4H_2O$(mg/L) | 4 | 4 | 8 |
| Biotin (mg/L) | 0.2 | 0.2 | 0.2 |
| Thiamine-HCl (mg/L) | 0.2 | 0.2 | 0.2 |
| Nicotinamide(mg/L) | — | — | 10 |
| Antifoamer (mL) | — | — | 0.5 |

For the preparation of the seed, *M. foliorum* parent strain stored at a temperature of −70° C. was inoculated into a 3 ml seed medium. The primary seed culture was performed hours at a temperature of 30° C. for 24 hours and then inoculated in 100 ml of the seed culture medium, and the secondary seed culture was performed at 30° C. for 24 hours. The secondary seed medium was finally inoculated into 2 L main culture production medium using a 5 L fermenter, and cultured at a culture temperature of 30° C. The air supplied into the fermenter was used in a sterilized state using a 0.2 um air filter, and culture was carried out according to the fermenter culture conditions in Table 2 below. In Table 2 below, the air supply unit was vvm (volume of air per volume of liquid per minute, L/min).

The supply method per pH-stat defines the increase in carbon source concentration (g/L) in the culture medium (fermenter) as the f value when the carbon source is input once, and the input time of the carbon source was adjusted so that the f-value was 0.25. For the composition of the additional medium, that is, the feeding solution, 400 g/L of allulose, 40 g/L of yeast extract and 1 mM of $MnCl_2$ were used. According to the basic principle of pH-stat, when the pH exceeds 6.95, sugar was supplied so that the pH decreased, and the pH was adjusted with 9% aqueous ammonia and a sugar solution in the pH range of 6.8 to 6.95. As a result, the cell concentration and enzyme activity increased as shown in Table above.

TABLE 2

| Culture step | Primary seed culture | Secondary seed culture | Main culture |
|---|---|---|---|
| Culture equipment | Test tube | Flask | 5 L fermenter |
| Culture volume | 0.003 L | 0.1 L | 2 L |
| Inoculation volume | 3% (v/v) | 6% (v/v) | 5% (v/v) |
| Culture time | 24 hr | 24 hr | 30-40 hr |
| RPM | 200 | 200 | 500-800 |
| Air (vvm) | — | — | 2 |

1-2: Preparation of Cell Immobilized Beads

The cultured cells are prepared as beads in the form of cells immobilized on alginic acid in order to have the property of being able to be used for a long period of time. Specifically, it proceeded by the following method. The cells whose culture was completed were centrifuged to recover the cells, which was mixed with distilled water to adjust the cell concentration to 4% (w/w), and then mixed with 4% (w/w) alginic acid dissolved in water in a ratio of 1:1. Thereby, a mixed solution of 2% (w/w) final cell concentration and 2% (w/w) alginic acid was prepared.

The mixed solution moves to a silicone tube connected to a slowly operating pump, and the mixed solution descends drop by drop through a syringe (inner diameter 0.20 to 0.30 mm) coupled to the end of the tube and mixed and stirred with 100 mM calcium chloride solution to form cured spherical or elliptical beads (1.8 to 2.2 mm in diameter).

The prepared beads can be used in the next process, but in order to further increase the internal alginic acid binding force, they are stirred while refrigerating and storing for 4 to 6 hours, replaced with a fresh 100 mM calcium chloride solution, which is further cured for about 6 hours at a low temperature of 5 to 15° C. or less. Thereby, immobilized beads in which the final cells are collected are prepared and used.

1-3: Coating Treatment of Cell-Immobilized Beads

Alginic acid beads containing the prepared cells removed water on the surface through a mesh sieve. After adding water two times the volume of the bead, it was stirred for 10 minutes. This process was repeated three times to remove the remaining calcium chloride solution.

The cell immobilized beads from which calcium chloride has been removed were added to a 0.5% (w/v) chito-oligosaccharide aqueous solution having two times the volume of the beads, the mixture was stirred at room temperature for 30 minutes, and the chito-oligosaccharide was coated on alginic acid beads. The beads subjected to the chito-oligosaccharide coating removed water on the surface through a mesh sieve, and then washed with water two times the volume of the beads and the remaining chito-oligosaccharide was removed through a sieve.

Example 2: Drying of Cell Immobilized Beads

As a specific illustrative example, the beads prepared, coated and washed in Example 1 were flatly placed on a plate so that drying was well performed in a dry-oven, and then drying was performed by a method in which hot air was circulated at 45° C. (±5° C.) for several hours. The drying was continued until the water containing in the beads was lowered to a level of about 14% or less. FIG. 1 shows photographs of beads before drying and beads obtained after drying, with the immobilized beads being dried according to an embodiment of the present disclosure.

The dried beads were measured for the volume, weight, bead diameter, water content, and bead bulk density together with the beads before drying, respectively. Specific measurement methods and results are as follows. The bead measurement results are shown in Table 3 below, and the relative numerical values shown in Table 3 refer to the relative measured values of the volume, weight, diameter, moisture content, and bulky density after drying, based on the numerical value 100 of the beads before drying.

(1) Measurement of Volume Change of Beads (Reaction Column Filling Rate)

In order to measure the change in the volume reduction of the beads before and after drying by a specific method, when the beads of Example 1-3 from which moisture has been removed as shown in the photographs of FIG. 1 were weighted in a volume of 100 mL in a measuring cylinder and then the volume after hot-air drying was measured, the volume of 10 mL was shown in the measuring cylinder, showing that the volume was reduced to about 10% relative to the volume of 100 before drying.

(2) Measurement of Weight Change of Beads

The weight change before and after drying was 7.5 g in weight after hot-air drying in 100 g of the beads before drying, in which the prepared beads were recovered from the solution, which was reduced to about 7.5% relative to before drying.

(3) Measurement of the Bulky Density of Beads

In order to measure the bulk density of the beads, when filled with 100 mL volume of beads before drying from which moisture has been removed, the weight thereof was 62.2 g, indicating a bulk density of 0.62 kg/L, and when filled with 100 mL of dried beads by the method, the weight thereof was 69.9 g, indicating a bulk density of 0.7 kg/L.

(4) Measurement of diameter distribution of beads

For the measurement of the diameter of the beads obtained before and after the hot-air drying, when the lengths of 20 beads were individually measured with a measuring instrument (Mitutoyo® M530-123 Caliper), the average diameter of beads before drying was 2.08 mm but the average diameter of beads after drying was 1.05 mm. When the average diameter of beads before drying was set to 100%, the average diameter of beads after drying was 50.5% relative to before drying, showing a reduction of 49.5%.

(5) Measurement of water content of beads

For the measurement of the water content, when 10 g of beads before drying and 10 g of beads after drying were measured for the weight change for 30 minutes under infrared irradiation conditions at 125° C. using a measuring equipment (A&D® MX-50 Moisture Analyzer), the water content of beads before drying was 95.9% (w/w), but the water content of beads after drying was 9.93% (w/w), resulting in the water content of about 10% based on the water content of 100 of beads before drying.

TABLE 3

| Item | Before drying (wet bead) | After drying (dried bead) | Relative measured value after drying (%) |
|---|---|---|---|
| Cylinder filling volume (mL) | 100 | 10 | 10 |
| Weight (g) | 100 | 7.5 | 7.5 |
| Bead average diameter (mm) | 2.08 | 1.05 | 50.5 |
| Water content (w/w %) | 95.9 | 9.93 | 10.4 |
| Bulky density | 0.62 Kg/L | 0.70 Kg/L | 112.9 |

Example 3: Restoration of Dried Beads 3-1: Restoration of Beads

The dried beads obtained in Example 2 requires a step of allowing them to be restored to their original form before being used in the reaction of converting fructose to allulose. The restoration method enables restoration to its original form by charging dried beads in 50brix (%) crystal fructose or water, which is a reaction substrate containing fructose.

Specifically, the dried beads before restoration were charged into a reaction column, and then a substrate for conversion reaction used for the production of allulose (50 brix (%) of crystalline fructose adjusted to a temperature of 50° C. and a pH of 6.5 to 7.2) was fed or circulated under a reaction temperature of 50° C. at a feed flow rate of 0.2 to 0.5 SV. The dried beads were hydrated by such a method and restored to their original shape. The photographs of the state before restoration of the dried beads and the restored beads obtained after restoration are shown in FIG. 3.

3-2: Analysis of the Characteristics of Restored Beads

Figure 3:
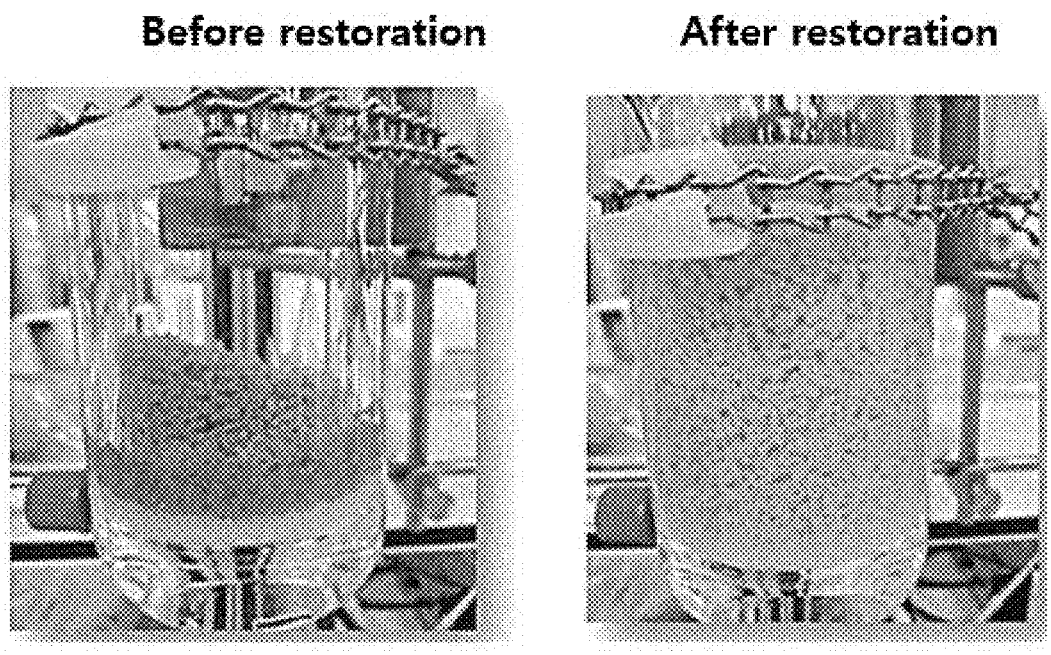
FIG. 3 shows a photograph of the restored beads obtained before and after restoration of the dried beads according to an embodiment of the present disclosure.

As shown in the bead photographs before and after restoration of FIG. 3, from the dried bead shape before restoration, the bead shape after restoration was restored to a spherical or oval-shaped bead similar to the beads before drying. Thereby, after the restored beads were filled in a reaction column, the reaction with the substrate could be smoothly performed, and the beads were uniformly filled in the reaction column, and channeling in which the flow of the reaction substrate flows in a specific direction has become a bead shape suitable for a reaction in which no problem occurs.

As shown in Table 4, for the analysis of the prepared beads, when the lengths of 20 beads were individually measured with a measuring instrument (Mitutoyo® M530-123 Caliper), the average diameter of the beads before restoration was 1.05 mm, but the average diameter of the beads after restoration was 1.43 mm. When the average bead diameter before drying was set to 100%, the average diameter of the restored beads was a level of about 68.8% relative to the beads before drying, showing a reduction rate of 31.2%.

At the initial same bead volume of 100 mL, when the beads that has undergone the restoration step by drying and hydration and the beads before drying that has not undergone the drying step were respectively filled in the reaction column, the reaction column filling rate (vol %) of the restored beads after drying was filled to 52 mL, confirming that the reaction column filling rate of the restored beads is 52%.

TABLE 4

| Item | Before drying (wet bead) | After drying (dried bead) | After restoration |
|---|---|---|---|
| Volume change (ml) | 100 | — | 52 |
| Bead average diameter (mm) | 2.08 | 1.05 | 1.43 |
| reaction column filling rate (vol %) | 100 | — | 52 |

3-3: Soaking Treatment of Restored Beads

In order to allow the dried beads whose restoration was completed in Example 3-2 to be used for the conversion reaction, a substrate containing fructose (pH 6.5-7.5) was added in a volume of 2 times the volume of the beads, and the mixture was stirred for 10 minutes. This process was repeated twice, and the inside of the beads was replaced with a 50 Brix (%) crystalline fructose solution.

After removing the fructose solution on the surface of the beads, a fructose-containing substrate for manganese ion treatment (10 mM $MnCl_2.4H_2O$ containing weight 50 brix crystalline fructose) was added in a volume of at least two times the volume of the beads for sufficient reaction of beads, then the mixture was slowly stirred in a 50° C. constant temperature water bath for 30 to 60 minutes, and the beads were treated with manganese ions. Then, the fructose-containing substrate on the bead surface was removed through a sieve, he fructose-containing substrate used for allulose conversion (1 mM $MnCl_2.4H_2O$ containing weight 50bx crystalline fructose) was added to at least two times the bead volume for sufficient washing of beads, the mixture was stirred for 10 minutes, and replaced with a new substrate. Through such a process, it was washed repeatedly at least twice or more to finally prepare the beads used for the conversion reaction.

Example 4: Preparation of Dried Beads (2)

4-1: Cell Heat Treatment

The *Microbacterium* spp. strains whose culture was completed in Example 1-1 were heat-treated in a cultured state in order to increase the activity of the cells, so that the process of increasing the activity of the cells was carried out. Specifically, after completion of the culture in a fermenter, the temperature of the fermenter was gradually increased from 30° C. to 60° C. while stirring the culture solution having a cell concentration of 18.5 (OD600 nm) at 150 rpm, and then kept at 60° C. for 1 hour to proceed with the cell heat treatment. Next, the heat-treated cell culture solution was obtained through a process of cooling from 60° C. to 30° C.

4-2: Analysis of Characteristics of Heat-Treated Cells

To measure the conversion activity (U/g_cell) value before and after cell heat treatment, the 35Brix crystalline fructose solution including the final concentration of 1 mM $MnCl_2.4H_2O$ dissolved in 50 mM PIPES buffer (pH 7.0), and the reaction solution including final dry cell concentration of 5 mg/ml were adjusted to a volume of 1 mL. Then, the reaction substrate solution containing the cells was reacted at 70° C. for 1 hour, and then centrifuged to recover a supernatant, and then high-performance liquid chromatography (HPLC) analysis was performed.

The liquid chromatography analysis was performed using an Agilent® 1260 Infinity Refractive Index Detector (RID) of HPLC (Agilent, Technologies, Inc., USA) equipped with an Aminex® HPX-87C column (BIO-RAD) Laboratories, Inc.) The cell activity was analyzed by the conversion concentration of allulose conversion-reacted from fructose under the conditions where water was used as a mobile phase solvent, a temperature was 80° C. and a flow rate was 0.6 ml/min. Further, the dry cell weight of 5 mg/mL used for the measurement of cell activity was diluted so that the absorbance of the culture solution becomes OD600 nm 12.5. Next, 1 mL was recovered, and centrifuged to remove the supernatant, and then when multiplied by the dry cell conversion coefficient 0.4 of the remaining cells, the dry cell concentration becomes 5 mg. 1 mL of the reaction substrate used for the conversion reaction was added to the dry cell concentration of 5 mg from which the supernatant was removed, and the final dry cell concentration was finally adjusted to 5 mg/mL and used for the reaction.

The results of comparing the change in cell concentration and the cell activity before and after heat treatment of the cells are shown in Table 5 below.

TABLE 5

| Category | Cell concentration | | Cell activity | |
| --- | --- | --- | --- | --- |
| | OD600 nm | Change rate (%) | Activity (U/g_cell) | Change rate (%) |
| Before heat treatment | 18.5 | 100 | 1168.3 | 100 |
| After heat treatment | 16.3 | 88 | 1345.9 | 115 |

As shown in the results of Table 5, the cell concentration after heat treatment was slightly lower that the cell concentration before heat treatment, showing that the cell concentration was reduced by about 88% as compared with that before the heat treatment. This is considered that during the heat treatment of the cells at 60° C., the lysis of the cells was partially caused by the high temperature, resulting in a decrease in the cell concentration.

Further, assuming that the cell allulose conversion activity before heat treatment was 100%, the conversion activity was measured by heat treating the same amount of cells as before heat treatment, and as a result, it was increased by 115% as compared with before heat treatment. This is considered to be because when the cells are heat-treated at 60° C., a porous cell wall that allows the substrate to transfer more smoothly to the cytoplasm was formed by the lysis of the cell wall of the cells due to high temperature, thereby enhancing the allulose conversion activity of the cells.

From the above results, it was confirmed that the decrease in cell concentration and the increase in cell conversion activity through heat treatment of cells actually increased the charging amount of cells by about 12% and increased the cell activity by about 15% during the preparation of cell-immobilized alginic acid beads, finally resulting in an increase of about 25% relative to the productivity before heat treatment at the time of bead production.

4-3: Preparation of Cell Immobilized Beads

The cultured cells were prepared as beads in the form of cells immobilized on alginic acid so as to have the properties that can be used for a long period of time.

Specifically, the heat-treated culture medium was centrifuged to recover the cells, which was then mixed with distilled water to adjust the cell concentration to 4% (w/w). 4% (w/w) alginic acid dissolved in water and the recovered cells were mixed at a weight ratio of 1:1 to prepare a mixed solution of 2% (w/w) final cell concentration and 2% (w/w) alginic acid.

In the case of using the heat-treated cells, the mixed solution tends to have lower viscosity as compared with the mixed solution using non-heat-treated cells as in Example 1-2. The viscosity of the alginic acid mixture using the heat-treated cells obtained in this Example and the alginic acid mixture using the non-heat-treated cells obtained in Example 1-2 was measured at a temperature of 25° C. using a Brookfield® Viscometer. As a result of the viscosity measurement, the viscosity of the alginic acid mixture of Example 1-2 was 5,580 cps, and the viscosity of the alginic acid mixture obtained in this Example was 4,900 cps, which showed 87.8% compared to before the heat treatment, which was a level reduced by about 12%. This is considered that the polysaccharide contained in the cells are partially removed by heat treatment and thus the viscosity is lowered.

The viscosity (cps) of the alginic acid mixture using the heat-treated cells and the non-heat-treated cells is shown in Table 6 below.

TABLE 6

| Category | Viscosity (cps) | Change rate (%) |
| --- | --- | --- |
| Alginic acid mixed solution of Example 1-2 | 5,580 | 100% |
| Alginic acid mixed solution of Example 4-2 | 4,900 | 87.8% |

The dried beads were measure for the volume, weight, bead diameter, water content, and bead bulk density together with the beads before drying, respectively. Specific measurement methods were the same as that of Example 2, and the results are shown in Table 7 below. The relative numerical values in Table 7 refer to the relative measured values of the volume, weight, diameter, moisture content, and bulky density after drying, based on the numerical value 100 of the beads before drying.

TABLE 7

| Item | Before drying (wet bead) | After drying (dried bead) | Relative measured value after drying (%) |
|---|---|---|---|
| Volume change (mL) | 100 | 9.3 | 9.3 |
| Weight change (g) | 100 | 7.2 | 7.2 |
| Bead average diameter (mm) | 2.01 | 1.02 | 50.7 |
| Moisture content (w/w %) | 95.9 | 9.64 | 9.9 |
| Bulk density (Kg/L) | 0.61 | 0.69 | 113.1 |

4-4: Restoration of Dried Beads

This is the same method as the restoration method of the dried beads of Example 3-1 and the soaking method of Example 3-3. The beads immobilized with the heat-treated cells obtained in Example 4-2 were restored, and the restored dried beads were soaked using a substrate (pH 6.5 to 7.5) containing fructose so that they could be used for the conversion reaction.

As shown in Table 8, for the analysis of the prepared beads, when the lengths of 20 beads were individually measured with a measuring instrument (Mitutoyo M530-123), the average bead diameter before restoration was 1.02 mm, but the bead diameter after restoration was 1.41 mm. When the average diameter of the beads before drying was set to 100% to calculate the relative size, the average diameter of the beads after drying was 52.7%, and the average diameter of the restored beads was 70.1%.

At the initial same bead volume of 100 mL, when the beads that has undergone the restoration step by drying and hydration and the beads before drying that has not undergone the drying step were respectively filled in the reaction column, the volume of the restored beads after drying was filled to 48 mL, confirming that the bead volume restoration rate was 48%.

TABLE 8

| Item | Before drying (wet bead) | After drying (dried bead) | After restoration |
|---|---|---|---|
| Volume change (mL) | 100 | — | 48 |
| Bead average diameter (mm) | 2.01 | 1.02 | 1.41 |
| Reaction column filling rate (vol %) | 100% | — | 48% |

Example 5: Preparation of Dried Beads (3)

5-1: Preparation of Cell Immobilized Beads and Dried Beads

In order to secure *Microbacterium oxydans* and *Microbacterium phyllosphaerae* as other species belonging to the same genera other than *Microbacterium foliorum*, cells were cultured in the same manner as in Example 1-1, and the cultured cells were centrifuged to recover the cells. *Microbacterium oxydans* and *Microbacterium phyllosphaerae* cells are the same as those described in Korean Patent No. 10-1944104.

The cultured cells were centrifuged to recover the cells, and then the recovered cells were processed in the same manner as in the method for preparing the cell immobilized beads of Example 1-2 and the method for coating the cell immobilized beads of Example 1-3 to prepare beads in a cell-immobilized form. Drying of the beads was performed in the same manner as in Example 2.

5-2: Restoration of Dried Cell-Immobilized Beads 10 g of immobilized beads containing dried *Microbacterium oxydans* or *Microbacterium phyllosphaerae* cells were placed in a beaker, and then 200 mL of water was added at room temperature, and then the mixture was stirred at a speed of 100 rpm for 30 minutes to perform a restoration process. The process of hydration with distilled water to restore the bead shape before drying is shown step by step in FIG. 4. For the beads before drying, beads after drying, and restored dried beads prepared for each strain, 20 beads were individually selected, and the bead length was measured with a measuring device (Mitutoyo M530-123), respectively, and the results are shown in Table 9 below. It can be confirmed that the beads prepared for each strain show similar results in diameter before and after drying, and that restoration is possible at the same diameter level through the restoration method.

Figure 4:
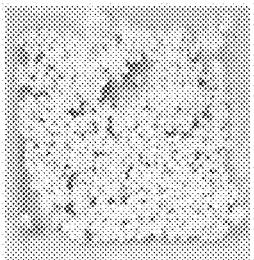
FIG. 4 shows a photograph of dried beads on which *Microbacterium oxydans* and *Microbacterium phyllospharae* cells are immobilized, a stereomicrograph (magnification ×40), and a diameter of the beads, according to an embodiment of the present disclosure.
Figure 4:
Figure 4:
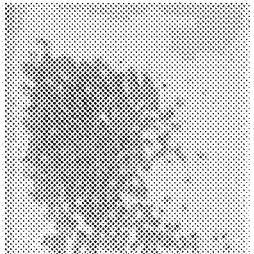
Figure 4:
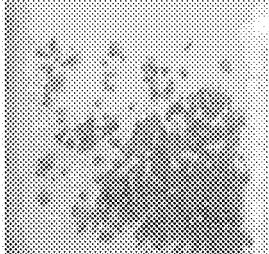
Figure 4:
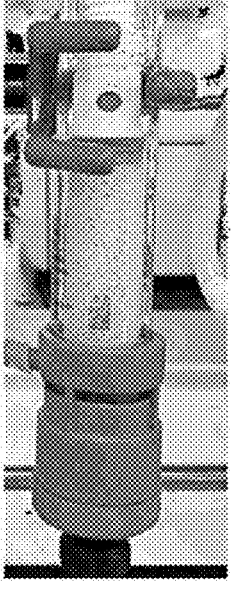
Figure 4:
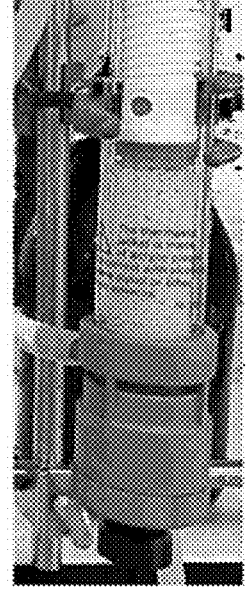

Further, as shown in the photograph of the restored beads of FIG. 4, it could be seen that restoration in a shape close to a spherical shape was possible similarly to *Microbacterium foliorum* cells.

TABLE 9

| Item | M. foliorum | M. oxydans | M. phyllosphaerae |
|---|---|---|---|
| Average diameter of beads before drying (mm) | 2.08 | 2.01 | 2.04 |
| Average diameter of beads after drying (mm) | 1.05 | 0.97 | 1.01 |
| Bead average diameter after restoration (mm) | 1.43 | 1.38 | 1.41 |

Example 6: Preparation of Dried Beads (4)

6-1: Preparation of Cells

The allulose epimerase coding gene (DPE gene; Gene bank: EDS06411.1) derived from *Clostridium scindens* ATCC 35704 was synthesized as a polynucleotide in a modified form optimized for *E. coli* (named as CDPE), and the polynucleotide was inserted into the same restriction enzyme site of the expression vector pCES208 (J. Microbiol. Biotechnol., 18:639-647, 2008) using restriction enzymes NotI and XbaI (NEB) to prepare the recombinant vector pCES208/allulose Epimerase (pCES_sodCDPE). The recombinant vector (pCES_sodCDPE) plasmid prepared above was transformed with *Corynebacterium glutaricum* using electroporation to prepare a *Corynebacterium glutaricum* recombinant strain expressing the CDPE enzyme. For the preparation method of the *Corynebacterium glutaricum* recombinant strain expressing the CDPE enzyme, refer to the preparation method described in Korean Patent No. 10-1607633.

6-2: Preparation of Cell-Immobilized Beads

The strain containing the recombinant strain producing allulose epimerase obtained in Example 6-1 was cultured and then centrifuged from the culture solution to recover the cells. The recovered cells were processed in the same manner as the method for preparing the cell-immobilized beads of Example 1-2 and the method for coating the cell-immobilized beads of Example 1-3 to prepare the beads in the cell-immobilized form, and drying of the beads was performed in the same manner as in Example 2.

Figure 5:
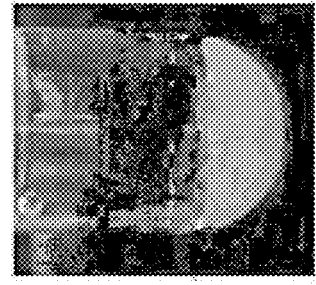
FIG. 5 is a photograph of a dried bead immobilized with a cell of a *Corynebacterium glutaricum* recombinant strain expressing an allulose epimerase of *Clostridium syndance*, a stereomicroscopic photograph (magnification×40) and the diameter of the beads.

6-3: Restoration of Dried Beads 10 g of the dried beads prepared in Example 6-2 were put in a beaker, 200 mL of water was added at room temperature, and then the mixture was stirred at a speed of 100 rpm for 30 minutes to perform a restoration step, and was allowed to stand for 6 hours. The photographs of the dried beads and the restored beads obtained by hydration for 6 hours, the stereomicrograph (magnification×40) and the diameter range of the beads are shown in FIG. 5. The average diameter of the restored beads restored by hydration of the dried beads was 1.05 mm.

As shown in the photographs of FIG. 5, the cell immobilized beads of *Corynebacterium glutaricum* could not be restored to their original bead shape even after hydration for 6 hours, and no further change could be seen even with the lapse of time.

As shown in Table 10 below, when the lengths of 20 beads were individually measured with a measuring instrument (Mitutoyo M530-123), the average diameter of the dried beads before restoration was 0.93 mm, but the bead diameter after restoration was 1.05 mm. When the average bead diameter before drying was set to 100%, the average diameter of the restored beads was a level of about 54% relative to the beads before drying, showing a reduction rate of 46%.

At the initial same volume of 100 mL beads, when the beads that has undergone the restoration step by drying and hydration and the beads before drying that has not undergone the drying step were respectively filled in the reaction column, the volume of the restored beads after drying was filled with 16 mL, confirming that the bead volume restoration rate was 16%. As a result, it was confirmed that the restoration rate of the cell immobilized dried beads of *Corynebacterium glutaricum* is low in such a manner that the shape of the beads does not restore to the shape before drying in the restoration step of the photographs of FIG. 5.

TABLE 10

| Item | Before drying (wet bead) | After drying (dried bead) | After restoration |
|---|---|---|---|
| Volume change (ml) | 100 | 9.1 | 16 mL |
| Bead average diameter (mm) | 1.92 | 0.93 | 1.05 |
| Reaction column filling rate (vol %) | 100% | — | 16% |

Example 7: Conversion Reaction Using Immobilized Biocatalyst 7-1: Evaluation of Conversion Activity of Beads In order to compare the allulose conversion activity of the dried beads on which the cells were immobilized in Example 2 and the dried beads on which the heat-treated cells were immobilized in Example 3, a productivity comparison experiment was conducted in the reaction column. As a coated bead prepared according to Example 1, a bead (bead 1) that was not subjected to cell heat treatment and drying process, a bead (bead 2) prepared according to Example 2, which was not subjected to heat treatment but was subjected to a drying process, a bead (beads 3) on which the heat-treated cells prepared according to Example 4-2 were immobilized and which was not subjected to a drying process, and a dried bead (bead 4) on which the heat-treated cells prepared according to Example 4-3 were immobilized were prepared.

The bead 1 was filled in the reaction column as it is, the bead 2, bead 3 and bead 4 were filled in the reaction column by performing restoration treatment in substantially the same manner as in Example 3. A substrate containing 50 brix (wt %) of fructose, which was adjusted to a temperature of 50° C. and a pH of 6.5 to 7.2, was fed through the reaction column filled with the beads. Allulose conversion activity and productivity experiments were performed under a flow rate maintaining an allulose conversion rate of 25% or more, and the experimental results are shown in Table 6 below. In the productivity evaluation, the productivity increase rate according to the increase of the flow rate relative to the flow rate of bead 1 was compared to the substrate flow rate at which the conversion rate of allulose from fructose of the initial reaction substrate was 25% or more in the bead filling volume of the reaction column filled with the same volume. That is, using beads 1 to 4, the bead filling volume (mL) of the reaction column was the same, and the reaction proceeded under the condition where the allulose conversion rate is maintained at 25% or more, so that the productivity was evaluated by the flow rate of the substrate liquid (mL/min).

As shown in Table 11, the productivity of the beads (bead 1) not subjected to the drying process was set to 100%, the beads of beads 2 to 4 were filled in the reaction column in the same volume as the bead 1. The fructose-containing substrate was fed according to the reaction conditions. At this time, the results for beads 2 to 4 were obtained.

As shown in Table 11, although the bead filling volume (mL) of the reaction column is the same for all beads 1 to 4, it was confirmed that due to the increase in allulose conversion activity by drying and/or heat treatment of cells, the flow rate at which the allulose conversion is maintained above 25% increases in the order of bead 1, bead 3, bead 2 and bead 4. That is, under the condition where the bead filling volume (mL) of the reaction column is the same, the high flow rate at which the allulose conversion rate is maintained at 25% or more means that the allulose conversion rate of the beads filled in the reaction column is relatively high. Therefore, it was confirmed that bead 1, which was not subjected to cell heat treatment and drying process, exhibits the lowest allulose conversion activity, the bead 2, which was not subjected to the cell heat treatment but was subjected to the drying process, is higher than that of the bead 1, the dried beads 4 on which heat-treated cells were immobilized have the highest conversion activity.

TABLE 11

| Bead | Substrate feed flow rate (mL/min) | Productivity increase rate (%) |
|---|---|---|
| Bead 1 | 0.13 | 100 |
| Bead 2 | 0.24 | 185 |
| Bead 3 | 0.19 | 146 |
| Bead 4 | 0.35 | 270 |

According to the results in Table 11, looking at the relative productivity value set based on the productivity 100 of the bead 1 that has not undergone the drying process and the cell heat treatment process, the productivity of the beads 3 and 4 was 146% and 270%, respectively, showing a significant increase. Such a factor for increasing productivity removes the polysaccharides and the like possessed by the cells by heat treatment, the increased reactivity of the allulose-converting enzyme contained in the cells with the fructose-containing substrate outside the cells and the reduced viscosity by heat treatment showed a smoother effect on the mobility of the fructose-containing substrate of the alginic acid beads, resulting in an increase in productivity.

Further, the bead 4 prepared by drying the alginic acid beads prepared using heat-treated cells increases the filling rate by about 200% at the same filling volume as the undried beads (bead 3), and finally, the bead 4 was filled in the same volume relative to the bead 1, which showed the productivity increase of 270% under the same reaction conditions.

7-2: Analysis of Reaction Stability of Beads

As described in Example 7-1, the dried beads (bead 4) on which the heat-treated cells prepared according to Example 4-3 were immobilized, and the beads (bead 1) that were not subjected to the cell heat treatment and drying process as the coated beads produced according to Example 1 were processed in the same manner as in Example 7-1 and filled in the reaction column A 0 Brix (%) crystal fructose solution, which was adjusted to a temperature of 50° C. and a pH of 6.5 to 7.2, was fed through the reaction column filled with the beads, and the reaction was carried out by setting the initial flow rate where the conversion rate from fructose to allulose was maintained at 25% or more. When the value at this time was set to 100%, the reduction rate value relative to the initial allulose conversion rate of the reaction solution for each reaction day is shown in FIG. 6.

Figure 6:
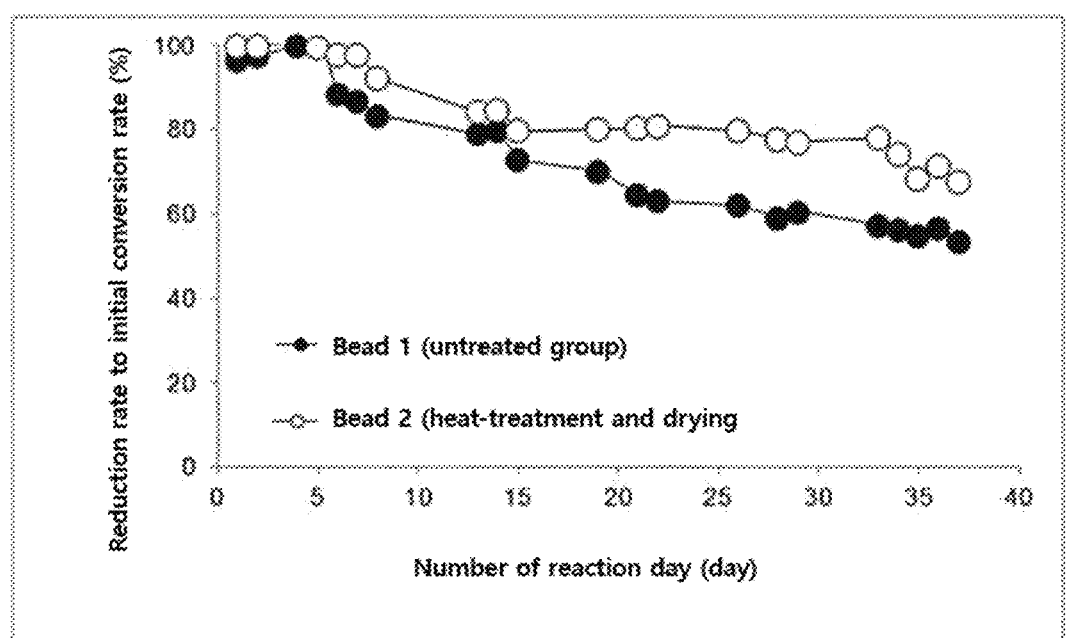
FIG. 6 is a graph showing the productivity increase rate and the relative conversion rate of the beads by performing an allulose conversion reaction using the cell immobilized beads according to an embodiment of the present disclosure.

According to the result of the reduction rate relative to the initial allulose conversion rate of FIG. 6 as in this Example, when about 35 days have elapsed from the initial conversion rate of 100% of the bead 1, the decrease relative to the initial conversion rate reached about 55%, whereas the stability of bead 4 subjected to heat treatment and drying was the same when about 35 days elapsed at an initial conversion rate of 100%. It can be seen that the rate of decrease relative to the initial conversion rate is maintained at about 70% or more. Thus, it was confirmed that the stability of the beads dried after heat treatment is higher than that of bead 1.

This is because the compression rate of the bead is higher than that of the bead 1 when restoring after bead drying treatment, whereby by imparting a relatively high binding force relative to the bead 1 prepared by the conventional method from the effect that the binding force of the beads is lowered by the reaction temperature of 50° C. and the Na+ ions added to the pH adjustment of the substrate, and so more favorable results were obtained in terms of bead stability.

Example 8: Storage Stability of Dried Beads

Dried beads using the heat-treated cells prepared in Example 4 were stored at storage temperatures of 25° C., 30° C., 37° C., 45° C., and 60° C. to evaluate the reduction rate of the allulose conversion activity of the beads according to the number of weeks of storage.

Specifically, some beads were taken according to the number of weeks of storage of the beads. The temperature of 5 mL of the reaction substrate (50Brix crystalline fructose solution adjusted to pH 6.5~7.2) was maintained at 60° C. in a round flask, 0.5 g of dried beads were added and reacted for 2 hours to obtain an allulose conversion rate. The reduction rate of the allulose conversion activity of the stored dried beads was performed in the same manner as in Example 7-1. Allulose conversion rate was measured and determined according to the number of weeks of storage.

The reduction rate of the allulose conversion activity of the beads according to the storage period and storage temperature of the beads is shown in Table 12 below.

TABLE 12

| Storage temperature | Change in conversion rate by number of weeks of storage relative to initial dried bead0 conversion rate (%) | | | | | | |
|---|---|---|---|---|---|---|---|
| | Immediately after preparation | 6$^{th}$ week | 10$^{th}$ week | 14$^{th}$ week | 21$^{th}$ week | 30$^{th}$ week | 38$^{th}$ week |
| 25° C. | 100.0 | 96.3 | 96.2 | 95.2 | 99.0 | 95.2 | 95.7 |
| 30° C. | | 91.9 | 87.6 | 88.9 | 88.6 | 88.9 | 88.0 |
| 37° C. | | 86.7 | 88.6 | 87.3 | 78.1 | 87.3 | 82.8 |
| 45° C. | | 90.2 | 85.4 | 82.9 | 78.7 | 75.2 | 78.7 |
| 60° C. | | 83.8 | 81.9 | 81.0 | 79.5 | 81.0 | 77.3 |

As shown in Table 12, looking at the results of the reduction rate by the number of week of storage relative to the conversion rate immediately after preparation of the dried beads, it was confirmed that the relative activity decreases slightly as the storage temperature increases, but at a temperature of 37° C. or less, the allulose conversion activity is maintained at 80% or more for 38 weeks, particularly, even at a high temperature of 60° C., the stability of the enzyme is maintained high by 75% or more even at 38 weeks.

The invention claimed is:

1. Dried beads for producing allulose, which comprises alginic acid or alginate as a carrier and a microbial cell of *Microbacterium* sp. microorganism producing allulose epimerase which is immobilized on the carrier, and has a water content of 14% or less, wherein the cells are heat-treated by heating a solution containing the cells at a temperature of 40 to 65° C. for 0.1 hours to 2 hours.

2. The beads of claim 1, wherein the dried beads have a reaction column filling rate (% by volume) of 35% or less, based on 100% of the reaction column filling rate (% by volume) of undried beads having a water content of 90% or more.

3. The dried beads of claim 1, wherein an average particle diameter of restored beads obtained after restoration treatment with a fructose-containing substrate is 120 to 190%, based on 100% of the average particle diameter of the dried beads.

4. The dried beads of claim 1, wherein the dried beads are subjected to restoration treatment with a fructose-containing substrate, to obtain restored beads having an average particle diameter of 1.1 to 1.9 mm.

5. The dried beads of claim 1, wherein the dried beads have an allulose conversion activity of 60% or more after being stored at a temperature of 25° C. for 38 weeks after production, based on 100% conversion activity of dried beads immediately after production.

6. The dried beads of claim 1, wherein the dried beads have an allulose conversion activity of 50% or more after being stored at a temperature of 60° C. for 38 weeks after production, based on 100% conversion activity of dried beads immediately after production.

7. The dried beads of claim 1, wherein the dried beads have an average bulky density of 0.6 to 0.8 Kg/L.

8. The dried beads of claim 1, wherein the beads are produced by dropwise adding a mixed solution of the cells and the carrier to a reaction solution containing a chloride compound of divalent cation.

9. The dried beads of claim 8, wherein the beads containing the cells and the alginic acid carrier comprise a coating layer of a swelling inhibitor.

10. The dried beads of claim 9, wherein the swelling inhibitor is at least one selected from the group consisting of chitosan, chitin, polyethylene glycol (PEG), polyethyleneimine (PEI), chito-oligosaccharide and polylysine.

11. The dried beads of claim 1, wherein the restored beads obtained after restoration treatment of the dried bead with a fructose-containing substrate, have a substrate feed flow rate (mL/min) of 110 to 300, based on 100% substrate feed flow rate of undried beads at which the allulose conversion rate is maintained at 25% or more by feeding 50 wt % of a fructose solution.

12. The dried beads of claim 1, wherein the allulose production amount of the beads restored with a fructose-containing raw material from the dried beads, is a relative allulose production amount of 110% or more, based on 100% allulose production amount of the beads that are not treated with the heat and drying for the microbial cells.

13. A method for preparing dried beads of claim 1 for producing allulose, the method comprising the steps of: cell-immobilized beads by dropwise adding a mixed solution comprising alginic acid or its salt as a carrier and a microbial cell of Microbacterium sp. Strain producing allulose epimerase, to a reaction solution containing a chloride compound of divalent cation; and subjecting the beads to a drying treatment.

14. A composition for producing allulose, which comprises the dried beads for producing allulose according to claim 1.

15. Restored beads having one or more properties, which are restored from the dried beads of claim 1:
 (i) 90% or more of a water content,
 (ii) 35% or more of a reaction column filling rate (% by volume) of, based on 100% of the reaction column filling rate (% by volume) of undried beads having a water content of 90% or more,
 (iii) 1.1 to 1.9 mm of an average particle diameter of the beads,
 (iv) 120 to 190% of an average particle diameter of the restored beads, based on 100% of the average particle diameter of the dried beads,
 (v) 110 to 300 of a substrate feed flow rate (mL/min) that the allulose conversion rate is maintained at 25% or more by feeding 50 wt % of a fructose solution, based on 100% substrate feed flow rate of undried beads, and
 (vi) about 110% or more of an allulose production amount of allulose conversion product obtained from a fructose-containing raw material, based on 100% of the allulose production amount of the beads before drying.

16. A method for preparing an allulose, which comprises contacting the restored bead of claim 15, with a fructose-containing substrate.

* * * * *